United States Patent
Green et al.

(10) Patent No.: US 8,098,968 B2
(45) Date of Patent: Jan. 17, 2012

(54) SILICIDE THERMAL HEATERS FOR SILICON-ON-INSULATOR NANOPHOTONIC DEVICES

(75) Inventors: William Michael John Green, Astoria, NY (US); Hendrik F. Hamann, Yorktown Heights, NY (US); Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 11/849,591

(22) Filed: Sep. 4, 2007

(65) Prior Publication Data

US 2011/0002576 A1   Jan. 6, 2011

(51) Int. Cl.
*G02B 6/12* (2006.01)
*G02F 1/01* (2006.01)

(52) U.S. Cl. ............................... 385/14; 385/1
(58) Field of Classification Search ........................ None
See application file for complete search history.

(56) References Cited

U.S. PATENT DOCUMENTS

| | | | |
|---|---|---|---|
| 4,517,581 A | 5/1985 | Thompson | |
| 5,021,361 A | 6/1991 | Kinoshita | |
| 5,726,462 A | 3/1998 | Spahn | |
| 6,047,098 A | 4/2000 | Sagawa | |
| 6,317,526 B1 * | 11/2001 | Shirasaki et al. | 385/3 |
| 6,370,307 B1 | 4/2002 | Bruce | |
| 6,408,126 B1 | 6/2002 | Hoekstra | |
| 6,442,311 B1 | 8/2002 | Barbarossa | |
| 6,539,143 B1 | 3/2003 | Hunter | |
| 6,760,496 B2 * | 7/2004 | Hammer | 385/11 |
| 6,823,097 B2 * | 11/2004 | Glebov et al. | 385/16 |
| 6,879,737 B2 * | 4/2005 | Kambe | 385/2 |
| 6,936,839 B2 | 8/2005 | Taylor | |
| 7,046,895 B1 | 5/2006 | Gunn | |
| 7,136,544 B1 | 11/2006 | Gunn | |
| 2003/0057428 A1 | 3/2003 | Day | |
| 2003/0121906 A1 | 7/2003 | Abbott | |
| 2004/0091195 A1 * | 5/2004 | Bischel et al. | 385/4 |
| 2006/0133754 A1 | 6/2006 | Patel | |
| 2007/0292075 A1 * | 12/2007 | Montgomery et al. | 385/14 |
| 2008/0181550 A1 * | 7/2008 | Earnshaw | 385/1 |

FOREIGN PATENT DOCUMENTS

| | | |
|---|---|---|
| JP | 04204523 | 7/1992 |
| WO | WO02/31555 A2 | 4/2002 |

* cited by examiner

*Primary Examiner* — Tina Wong
(74) *Attorney, Agent, or Firm* — Michael J. Buchenhorner; Vazken Alexanian

(57) ABSTRACT

A thermally switched Silicon-On-Insulator (SOI) photo electronic device includes a silicon layer including an optical waveguide and a silicide heating element horizontally adjacent to the waveguide. The waveguide has a refractive index that changes with heat applied to the waveguide.

25 Claims, 4 Drawing Sheets

SILICIDE THERMAL HEATERS FOR SILICON-ON-INSULATOR NANOPHOTONIC DEVICES

STATEMENT AS TO FEDERALLY SPONSORED RESEARCH AND DEVELOPMENT

This invention was made with government support under Contract No. N00014-07-C-105 (DARPA) awarded by the Defense, Advanced Research Projects Agency. The government may have certain rights to this invention.

BACKGROUND OF THE INVENTION

1. Field of the Invention

This invention relates to nanophotonic devices and particularly to silicide thermal heaters for silicon-on-insulator nanophotonic devices.

2. Description of Background

Control and switching of the operating parameters of arbitrary silicon-on-insulator (SOI) nanophotonic devices is possible by changing the temperature of the silicon waveguide in which the light is guided. A small change in temperature can induce a change in the refractive index of the silicon waveguide via the thermooptic effect, altering the effective optical length, permitting sensitive control over the manner in which light travels through the device. The temperature of any SOI photonic device may be changed locally by fabricating a metallic thin film resistive heater on or near the device itself. By passing a current through a thin film resistor, the temperature of both the resistor and the adjacent SOI device increase in proportion to the electrical power dissipated.

Thermal control of SOI nanophotonic devices is particularly relevant in application to optical circuit switched networks, where low power thermal ON-OFF switching with very low insertion loss is required. While thermally actuated silicon photonic devices have been previously studied, the past implementations suffer from a number of problems, the greatest being that they require processing which is incompatible with standard modern CMOS device manufacturing (choice of metals and liftoff deposition technique). Additional drawbacks of previous thermal heaters designs also include:

Exceedingly large footprint, with very wide heater stripes in comparison with nanophotonic waveguide dimensions, i.e. >10 µm;

Low thermal efficiency and large switching power, due to large heated area and large required power for inducing required temperature change at waveguide;

Excessively high switching voltage (>100 V required to pass current directly through silicon waveguide due to high series resistance) and large free carrier induced ON-state loss in the case of passing current directly through the silicon waveguide; and Slow response time, due to inefficient transport of heat through non-conductive oxide films surrounding the waveguide.

The following is a discussion of some structures known to Applicant but which are not necessarily prior art to the claimed invention and their being mentioned is not an admission of prior art status. Referring to FIG. 1, there is shown a structure 100 with a stripped waveguide 102. A heater 104 is included in a separate piece of material that is in contact with the buried oxide layer 106. In FIG. 2, a heater is located directly above a buried oxide layer in which the silicon waveguide is embedded. FIG. 3 illustrates an approach where cladding provides heat to a silicon waveguide that is vertically disposed on a substrate. FIG. 4 shows a metal heater on a buried oxide layer. This has the shortcoming that it is not CMOS compatible.

For these reasons, novel solutions to the above problems are required before thermally controlled SOI nanophotonic devices become practical within large scale integrated optical circuits.

SUMMARY OF THE INVENTION

The shortcomings of the prior art are overcome and additional advantages are provided through the provision of a thermally-switched Silicon-On-Insulator (SOI) photo electronic device including a silicon layer on an oxide layer. The silicon layer includes an optical waveguide having a refractive index; and a resistive heating element located horizontally adjacent and in close proximity to the waveguide for generating heat to the waveguide such that the refractive index is changed by the heat.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
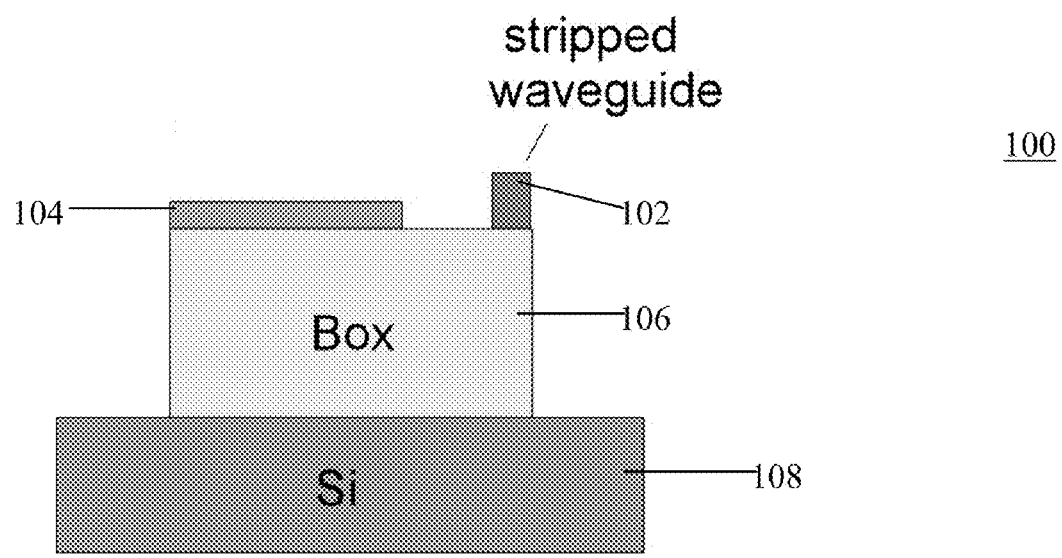
FIG. 1 illustrates one example of a known device.
Figure 2:
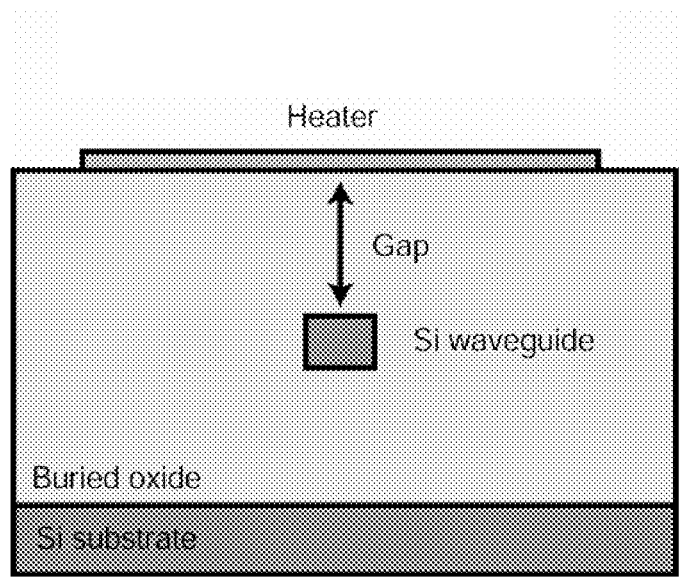
FIG. 2 illustrates another example of a known device.
Figure 3:
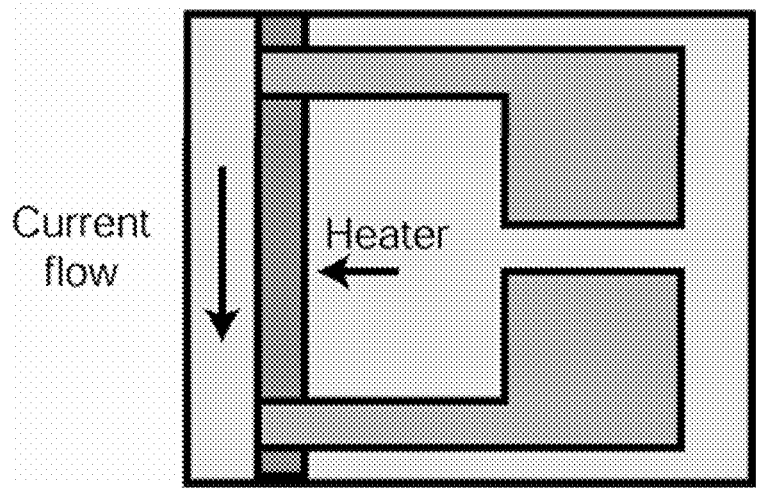
FIG. 3 illustrates another example of a known device.
Figure 4:
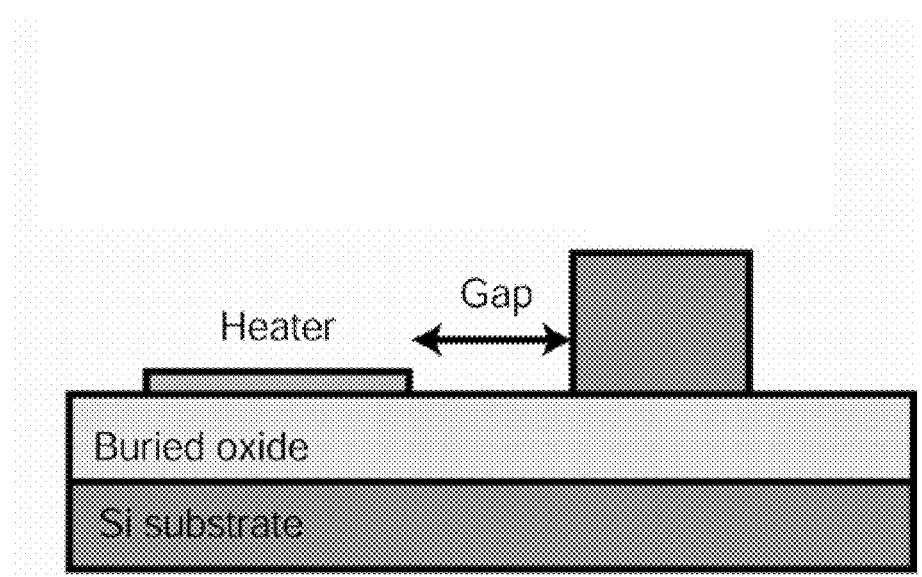
FIG. 4 illustrates another example of a known device.
Figure 5:
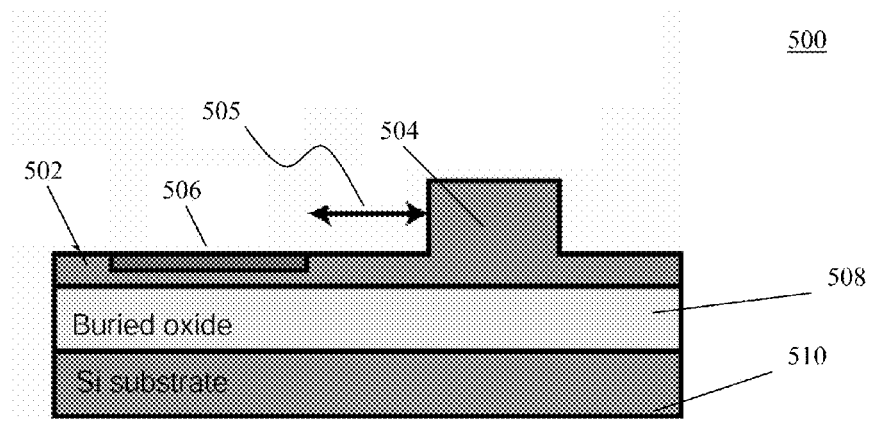
FIG. 5 illustrates one example of a photo electronic device, according to an embodiment of the present invention.

Turning now to the drawings in greater detail, it will be seen that in FIG. 5 there is shown a structure 500 according to an embodiment of the invention. The structure includes a thermally-switched Silicon-On-Insulator (SOI) photo electronic device including a thin silicon layer 502 on an oxide layer 508. The silicon layer 502 comprises an optical waveguide 504 having a refractive index; and a resistive heating element 506 embedded within the silicon layer 502 and located horizontally adjacent and in close proximity to the waveguide 504 for generating heat to the waveguide such that its refractive index is changed by the heat. The silicon layer 502 is produced over a buried oxide layer 508, which is itself disposed on a silicon substrate 510.

In this embodiment, the thermal heater 506 uses standard silicide processing, commonly used to form ohmic contacts to the source, drain, and gate terminals of MOSFET transistors, to form the thin film resistive heater, rather than liftoff metallization. Therefore, the design of this embodiment may be seamlessly integrated with standard CMOS circuitry, requiring no non-standard processing. In addition, this design results in thermooptically actuated silicon nanophotonic devices with superior performance compared to previous designs, having low loss, low ON-OFF switching power, and low voltage operation, with fast response times. These enhancements result from the improved thermal conduction properties of fabricating a silicide thermal heater embedded within a thin slab of silicon, horizontally adjacent and in close proximity to both the silicon nanophotonic waveguide and the silicon substrate.

The problems encountered by previous implementations of thermal heaters may be solved by fabricating the thin film resistive heater 506 within a thin slab region of a silicon rib waveguide 504, using a silicide material (for example, but not exclusive to nickel, cobalt, or titanium silicides). FIG. 5 illustrates the proposed geometry. Rather than etching the Si waveguide 504 completely down to the buried oxide layer 508, a deep rib waveguide 504 is used. The thin slab of silicon remaining around the thick rib waveguide core region 504 needs to be only a few tens of nanometers (for example 10-100 nm) thick in this embodiment. This deep rib waveguide design has very similar properties to SOI nanophotonic waveguides which are etched completely down to the buried oxide layer, including single mode guiding, low propagation loss, and ultra-compact bend radius.

The thin silicide heater 506 is then formed within this thin silicon slab 502, leaving a small gap 505 (for example 250-1000 nanometers) between the heater 506 and the edge of the waveguide 504. The resistance of the silicide heater 506 depends upon the type of silicide used, as well as the width and thickness of the silicide layer thickness and width of the silicide heater depend upon the desired resistance of the thermal heater.

The integrated silicide thermal heater 506 discussed herein has the following advantages: 1) full CMOS manufacturing compatibility; 2) limited heated area and high thermal efficiency, low power, low voltage operation; 3) improved thermal response time; and 4) no excess ON-state loss.

Full CMOS Manufacturing Compatibility:

While the deposition of thermal heaters by liftoff metallization is incompatible with CMOS processing, the silicide thermal heater 506 discussed herein can be formed during the same process as the self-aligned CMOS silicidation step, commonly used to form ohmic contacts to the source, drain, and gate terminals of MOSFET transistors. The regions to be silicided can be defined lithographically by patterning/removing silicide-blocking films, often deposited to protect integrated polysilicon on-chip resistors from silicidation.

Limited Heated Area and High Thermal Efficiency, Low Power, Low Voltage Operation:

By placing the thermal heater 506 horizontally adjacent to the waveguide 504, the heater's proximity to the silicon wafer substrate 510 is substantially reduced. The silicon substrate 510 acts as a large heat sink, drawing heat downwards from the silicide heater 506, and limiting the horizontal extent of the hotspot around the heater 506. Consequently, only a small area around the heater 506 increases in temperature when current is applied, resulting in efficient application of this heat directly to the nanophotonic waveguide 504, rather than wastefully heating a broad area.

Furthermore, heat can be applied at low power (less than 5 microWatts) and at CMOS compatible low voltages (less than 1 Volt) in this design, because of the low resistivity of silicide materials achievable within standard CMOS processing (typically about 10-15Ω/square).

Improved Thermal Response Time:

By positioning the thermal heater horizontally adjacent to the waveguide, the distance heat must diffuse to reach both a) the silicon waveguide, and b) the silicon substrate heat sink is substantially reduced, in comparison to the design in which the thin film heater is placed on top of the silicon waveguide, over an oxide overcladding. This will lead to improvement in both the ON and OFF thermal response times. Furthermore, formation of a small area silicide heating element embedded within a thin layer of silicon will result in an additional improvement in response time. The large thermal conductivity of silicon, which surrounds the resistive heater on three sides, will serve to rapidly conduct heat away from the heater when the applied current is turned OFF, permitting much faster hot-cold temperature cycling in comparison to the case of a resistive thin film heater surrounded by silicon dioxide films.

No excess ON-State Loss:

The strong confinement of the optical mode within the deep rib waveguide core allows the silicide heater strip to be brought very close (~0.5 um) to the edge of the waveguide without inducing any optical losses. Furthermore, since thermooptic effects are employed to control the SOI nanophotonic device, there is no excess loss induced in the waveguide when the heater is turned ON, i.e. when current is passed through the heater. This is in contrast to the case for electrooptic SOI nanophotonic devices, in which free carriers are injected into the waveguide to produce a change in the silicon refractive index. The presence of these free carriers also induces significant optical losses.

Making use of the silicide thermal heater design disclosed herein will permit thermooptically actuated optical circuit switches with fast response times to be seamlessly integrated with standard CMOS drive electronics, requiring no non-standard processing.

Figure 6:
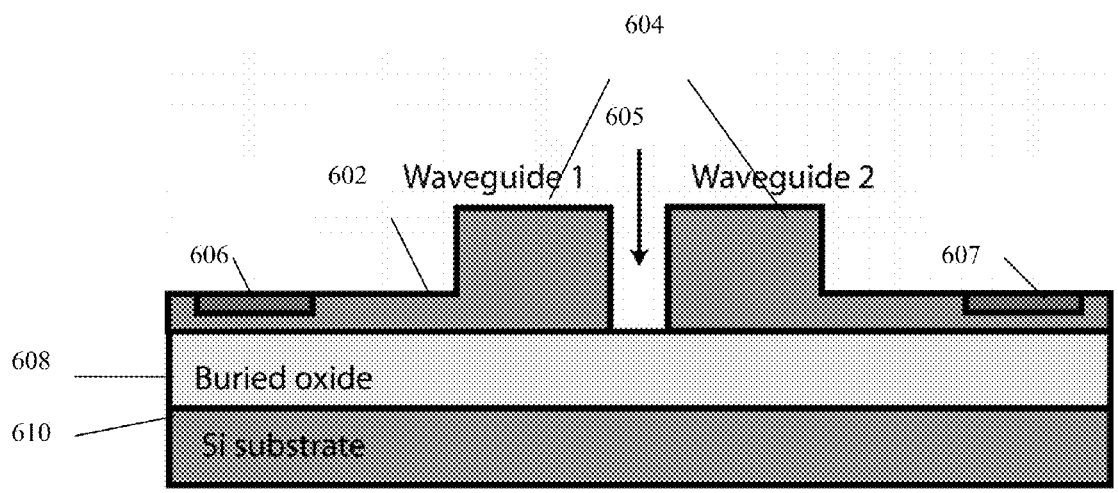
FIG. 6 illustrates an example of a photo electronic device comprising two waveguides, according to another embodiment of the present invention.

Referring to FIG. 6 there is shown an illustrative example of the silicide thermal heater geometry generalized to applications/devices in which two or more nanophotonic rib waveguides 604 are placed in close proximity with one another, yet are actuated independently. FIG. 6 shows a pair of nanophotonic rib waveguides 604 with independent silicide heaters 606 and 607. The waveguides 604 are optically separated from one another by a gap 605 etched into the silicon layer 602. When the width of the gap 605 is made appreciably small, evanescent coupling of the discrete waveguides 604 can result. Where fully decoupled devices are desired, the width of the gap 605 may be made large enough that the waveguide modes no longer interact. Furthermore, the fully etched gap 605 increases the thermal resistance between the two waveguides 604, for independent heating of each individual waveguide without thermal crosstalk.

Thermally tunable and reconfigurable optical devices including but not limited to directional couplers, power splitters, interferometers, phase shifters, switches, and filters may be assembled using these independently tunable coupled waveguides. Compactness of these devices is preserved by the micron-scale localized hotspot of the silicide heater design, in addition to isolation from thermal crosstalk provided by the fully etched gap 605.

Figure 7:
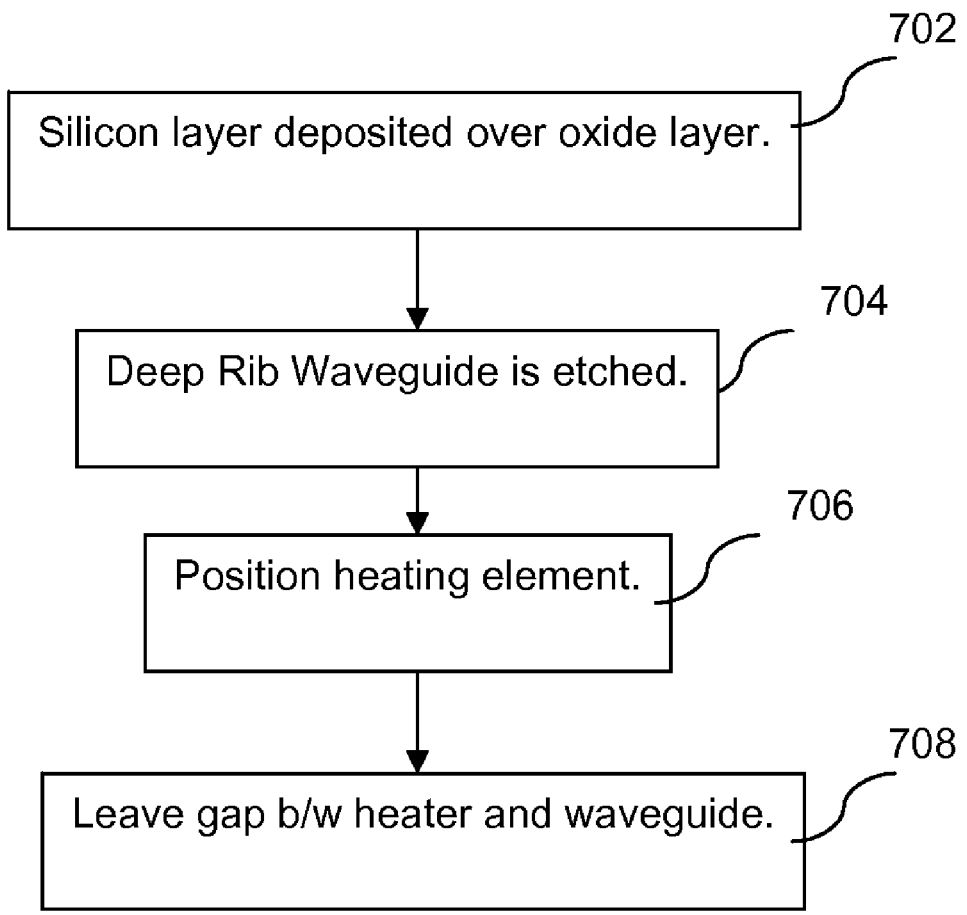
FIG. 7 is a flow chart of a method according to an embodiment of the invention.

Referring to FIG. 7, there is shown a flow chart of a method 700 of fabricating a photo electronic device 500 according to another embodiment of the invention. In step 702 a silicon layer 502 is deposited over an oxide layer 508. In step 704, the silicon layer 502 is further processed by etching a deep rib optical waveguide 504 center in the silicon layer 502 over the oxide layer 508. The waveguide has an index of refraction. A thin slab of silicon, not etched into the waveguide 504, remains around the waveguide core region. Note that step 704 may be modified to create additional waveguides 504.

In step 706 a thin heating silicide element 506 is formed horizontally adjacent and in close proximity to the waveguide 504 such that the index of refraction changes as a function of variations of heat produced by the heating element 506. In step 708 a small gap 505 is left between the heater 506 and the edge of the waveguide 504. For embodiments with multiple waveguides, the gap 505 is etched into the silicon 502.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention described.

The invention claimed is:

1. A thermally-switched photo electronic device comprising:
   a silicon layer disposed over an oxide layer, the silicon layer comprising:
   an optical waveguide comprising a refractive index, said optical waveguide etched into the silicon layer with a thin slab of silicon surrounding a core region of said optical waveguide; and
   a resistive heating element embedded within the silicon layer and located horizontally adjacent and in close proximity to the optical waveguide and the silicon layer for generating heat to the optical waveguide so that the refractive index changes in response to the heat.

2. The device of claim 1, wherein the resistive heating element comprises a silicide material.

3. The device of claim 2, wherein the silicide material comprises nickel silicide.

4. The device in claim 2 wherein the silicide material comprises cobalt silicide.

5. The device in claim 2 wherein the silicide material comprises titanium silicide.

6. The device in claim 1 wherein the optical waveguide comprises a deep rib waveguide etched into the silicon layer.

7. The device in claim 6 wherein the waveguide further comprises single mode guiding for achieving low propagation loss.

8. The device of claim 1, wherein the photo electronic device comprises a filter.

9. The device of claim 8, wherein the heating element is placed horizontally adjacent to the optical waveguide at a distance that enhances thermal conductivity to said optical waveguide.

10. The device of claim 6, wherein the optical waveguide is surrounded by a thin slab of silicon.

11. The device of claim 1 wherein the heating element is located at a distance of 250-1000 nanometers from the optical waveguide.

12. The device of claim 10 wherein strong confinement of the optical mode within the optical waveguide allows the heating element to be within 0.5 micrometers to an edge of the optical waveguide without inducing optical loss.

13. A method of fabricating a photo electronic device, the method comprising:
    fabricating a silicon layer over an oxide layer, the silicon layer fabricated by a method comprising:
    etching a deep rib optical waveguide in the silicon layer over the oxide layer with a thin slab of silicon surrounding a core region of said optical waveguide, the waveguide comprising an index of refraction; and
    embedding a thin resistive heating element horizontally adjacent and in close proximity to the waveguide and the silicon layer to generate heat to the optical waveguide such that the index of refraction changes as a function of variations of heat produced by said heating element.

14. The method of claim 13 wherein embedding the resistive heating element comprises embedding said resistive heating element with a silicide material.

15. The method of claim 14 wherein embedding the resistive heating element comprises embedding said resistive heating element with nickel silicide.

16. The method of claim 14 wherein embedding the resistive heating element comprises embedding said resistive heating element with cobalt silicide.

17. The method of claim 13 further comprising producing the optical waveguide with single mode guiding.

18. The method of claim 13 further comprising placing the heating element horizontally adjacent to the waveguide with a short gap between the heating element and the optical waveguide for enhancing thermal conductivity to the optical waveguide.

19. The method of claim 13 further comprising locating the heating element within a range of 250-1000 nanometers from the optical waveguide.

20. The method of claim 13 further comprising placing the resistive heating element within 0.5 micrometers of an edge of the optical waveguide without inducing optical loss.

21. A thermally-switched photo electronic device comprising:
    a silicon layer disposed over an oxide layer, the silicon layer comprising:
    a plurality of optical waveguides comprising refractive indices, said optical waveguides etched into the silicon layer with a thin slab of silicon surrounding core regions of said optical waveguides;
    wherein the optical waveguides are optically separated by a gap etched into the silicon layer; and
    a resistive heating element thermally coupled with each optical waveguide, the resistive heating element embedded within the silicon layer and located horizontally adjacent and in close proximity to its associated optical waveguide and the silicon layer for generating heat to its associated optical waveguide so that the refractive index changes in response to the heat.

22. The device of claim 21 wherein each of the plurality of optical waveguides are nanophotonic rib waveguides.

23. The device of claim 22 wherein the waveguides are actuated independently.

24. The device of claim 21 wherein a width of the gap determines interaction of the waveguides.

25. The device of claim 21 wherein the thin slab of silicon surrounding core regions of the optical waveguides has a thickness of 10 nanometers.

* * * * *